United States Patent [19]
De La Huerga

[11] Patent Number: 5,883,576
[45] Date of Patent: Mar. 16, 1999

[54] IDENTIFICATION BRACELET WITH ELECTRONICS INFORMATION

[76] Inventor: Carlos De La Huerga, 9190 N. Upper River Rd., Milwaukee, Wis. 53217

[21] Appl. No.: 7,290

[22] Filed: Jan. 14, 1998

[51] Int. Cl.[6] .................................................. G08B 23/00
[52] U.S. Cl. .................. 340/573.1; 340/539; 340/572.8; 340/572.9; 340/573.4; 340/825.49
[58] Field of Search .................................... 340/573, 539, 340/825.44, 825.49, 825.54, 572, 571

[56] References Cited

U.S. PATENT DOCUMENTS

| | | | |
|---|---|---|---|
| 4,694,284 | 9/1987 | Leveille et al. | 340/574 |
| 4,885,571 | 12/1989 | Pauley et al. | 340/573 |
| 4,952,928 | 8/1990 | Carroll et al. | 340/825.54 |
| 4,973,944 | 11/1990 | Maletta | 340/568 |
| 4,980,671 | 12/1990 | McCurdy | 340/568 |
| 5,012,229 | 4/1991 | Lennon et al. | 340/706 |
| 5,032,823 | 7/1991 | Bower et al. | 340/568 |
| 5,075,670 | 12/1991 | Bower et al. | 340/573 |
| 5,115,223 | 5/1992 | Moody | 340/573 |
| 5,493,805 | 2/1996 | Penuela et al. | 40/633 |
| 5,499,626 | 3/1996 | Willham et al. | 128/630 |
| 5,512,879 | 4/1996 | Stokes | 340/573 |
| 5,512,880 | 4/1996 | Abrams et al. | 340/573 |
| 5,594,786 | 1/1997 | Chaco et al. | 379/93 |
| 5,609,716 | 3/1997 | Mosher, Jr. | 156/522 |
| 5,612,675 | 3/1997 | Jennings et al. | 340/573 |
| 5,621,384 | 4/1997 | Crimmins et al. | 340/539 |
| 5,627,520 | 5/1997 | Grobbs et al. | 340/572 |
| 5,742,233 | 4/1998 | Hoffman et al. | 340/573 |
| 5,768,813 | 6/1998 | Reboul et al. | 40/301 |
| 5,771,001 | 6/1998 | Cobb | 340/573 |
| 5,793,290 | 8/1998 | Eagleson et al. | 340/573 |

*Primary Examiner*—Jeffery A. Hofsass
*Assistant Examiner*—Toan N. Pham
*Attorney, Agent, or Firm*—Quarles & Brady, LLP

[57] ABSTRACT

An identification assembly for identifying a patient including a strap which can be secured around a patient's wrists or the like which cannot be removed thereafter without destroying the strap, an electronic memory means which is integrally secured to the strap and cannot be removed therefrom without destroying the memory means and a removably attachable transmitter assembly which can be attached to the strap for communication with the memory means or removed from the strap, the transmitter assembly including a processor for reading information from the memory means and a transmitter for transmitting information read from the memory means, the transmitter and processor also capable of cooperating to receive signals and provide data to the memory means.

32 Claims, 6 Drawing Sheets

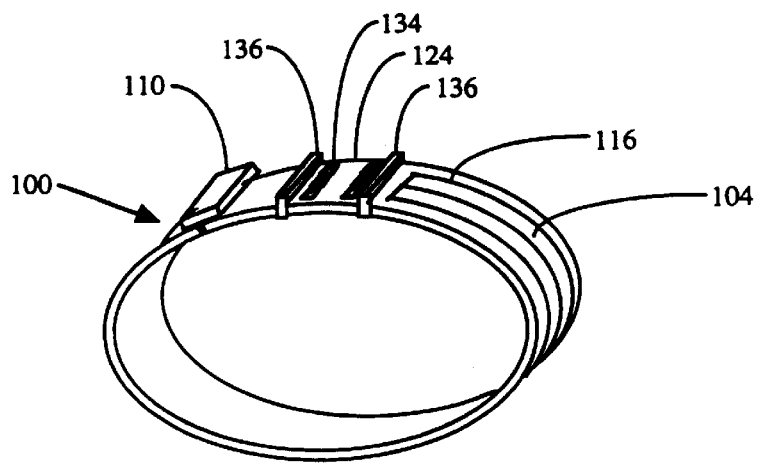
Figure 6
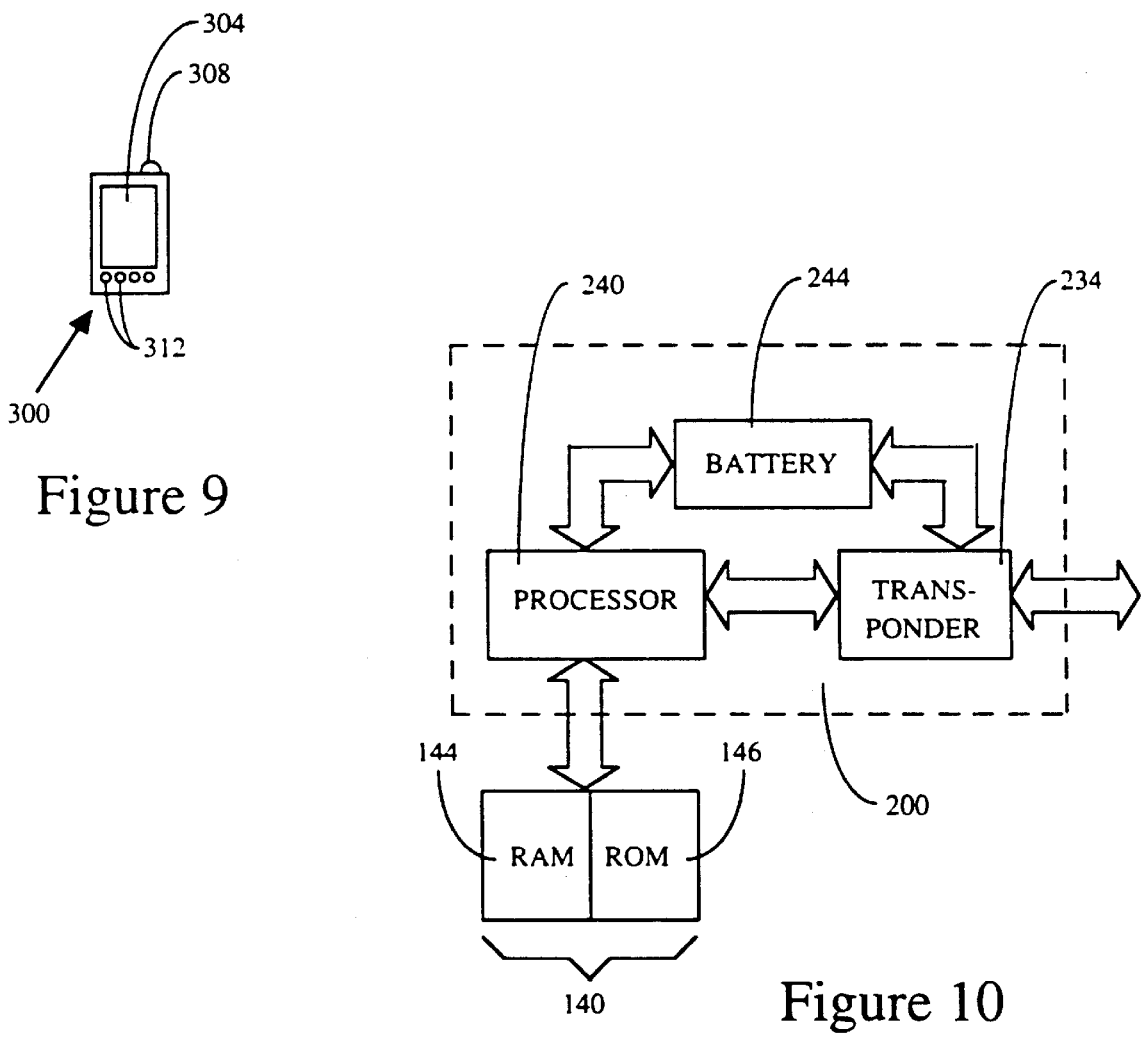
Figure 9
Figure 10

IDENTIFICATION BRACELET WITH ELECTRONICS INFORMATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to identification bracelets and more particularly to a disposable bracelet having an embedded electronic memory and a reusable transceiver which is releasibly attachable to the bracelet for receiving data from a remote source to be stored in the memory and transmitting data stored in the memory to a remote receiver.

Throughout time accurate patient identification has been a paramount concern in administering medication to, and performing medical procedures on, a patient. Years ago patient identification was relatively simple as local doctors would provide all types of medical care for essentially every person within a small community and knew each patient personally.

However, in today's medical environment, patient identification is a much more arduous task for many reasons. First, literally hundreds of patients are examined and treated on a daily basis in large modern medical facilities, each doctor or nurse interacting with as many as twenty or more patients within a single day. With such high traffic unaided positive patient identification is nearly impossible for any doctor or nurse.

Second, many medical facilities are expansive including specialized departments which are spread out throughout the facility, many departments being on different floors or even in different buildings. For example, diagnostic examination, imaging, surgery, recovery, etc., areas are all usually separate and staffed by different personnel. As a patient is moved from one department to another, even if personnel within one department can visually identify a patient, personnel in another department may not be able to identify the patient.

Third, many patients are admitted into a medical facility for a period which is longer than a single shift. Where facility personnel changes during a patient's stay, unaided patient identification would be nearly impossible.

Fourth, in many cases medical personnel cannot rely on a patient for correct identification. Some patients might be experiencing severe trauma, be under the influence of medication or be asleep, thereby making positive identification verification impossible.

For years the standard for patient identification has been to place an identification bracelet on each patient's wrist. One bracelet includes a clear plastic sleeve having first and second ends and a paper strip. Information including a patient's name, an identification number and perhaps primary appearance characteristics (e.g. eye color, hair color, height, weight, etc.), are printed on a viewing surface of the strip. The strip is inserted in the sleeve with the viewing surface observable through the sleeve. The two ends of the sleeve are integrally joined using a mechanical fastener thereby forming a ring around the patient's wrist. These bracelets are designed to be removed only by cutting so that once a bracelet is placed on a patient, the bracelet cannot mistakenly be placed on another patient. In addition, these bracelets are inexpensive enough that they are disposable.

While these bracelets are helpful, often it is difficult to read information from the paper strips within the sleeves as the sleeves often hinder viewing, the paper strips slide inside the sleeve and can even become folded or crimped within the sleeve.

Recently, new plastic materials and new printing methods have been developed which enable printing directly on plastic surfaces. In addition, new adhesives have been developed which are used to fasten bracelet ends together. This new technology has facilitated single piece bracelets wherein identification material is printed directly on a viewing surface of a plastic strap and the strap is secured around a patient's wrist using an adhesive.

A patient's bracelet is used by all medical facility personnel to identify a patient. Prior to administering a medication a nurse or doctor reads the patient's name from the bracelet and compares the patient's name with the name of the patient for whom the medication was dispensed. The patient's name is usually printed either on a medication order or on a paper enclosed with the medication in a container or bag.

In addition, prior to performing any medical or diagnostic procedure, facility personnel also use the bracelet to identify a patient. For example, a person recording an electrocardiogram (EKG) to be sent to a computerized storage system will often be instructed to provide, via a keyboard, a patient's name and identification number from the bracelet. Both the name and number are often requested as a misspelling of the name is a fairly common mistake and the identification number provides redundant identification.

For the purpose of this explanation, printed plastic bracelets will be described as printed bracelets. While printed bracelets have improved identification, printed bracelets have a number of important shortcomings. First, only a small amount of information can be printed on a bracelet. In this regard, unless a person viewing identification information has a medical history file in his/her possession, the person cannot identify immediate medical status of a patient (e.g. medication to be administered, time to administer medication, recent medical procedures, symptoms, etc.).

Second, information on a plastic bracelet cannot automatically be transferred to electronic instrumentation such as an EKG machine, an imaging machine, etc. where a medical instrument requires patient information, the information must be manually provided by facility personnel.

Third, each time a patient must be identified, the doctor, nurse or orderly identifying the patient must pick up the patient's wrist and rotate the wrist or the bracelet to a position wherein the identification information is observable. While this simple procedure is not in and of itself difficult for a person to perform or extremely bothersome to a patient; when the procedure must be performed a dozen or more times each day, the cumulative effect can be both bothersome to the patient and burdensome to the person who has to identify the patient.

Fourth, once information has been printed on the bracelet, the information cannot be changed and additional information cannot be added. This may not be important during short stays at a medical facility because printed information likely will not change appreciably over a short period. However, during a long stay at a facility, some printed information, in particular primary appearance characteristics (e.g. weight, etc.), may change and therefore should be updated.

One way in which to transfer identifying information from a bracelet to a medical instrument is to provide identifying information in bar code form. Bar codes, however, also have short-comings. While a bar code provides a machine readable format, only a limited amount of information can be represented by a bar code. This is because bar codes typically require as much space per represented character than the conventional alphabet. While smaller codes are possible, smaller codes are extremely difficult to read. In addition, practically, only a certain length of bar code is possible given the natural curve of a patient's wrist and the requirement that the code be essentially flat during scanning. In addition, like conventional printing, bar codes cannot be modified and therefore bracelet information cannot be modified after a bar is printed. Because a bar code cannot be read unless it is essentially flat, a bar code, to a greater extent than conventional print, requires special placement of a patient's wrist to read represented information. Furthermore, non-contact bar code reading devices are relatively expensive and often it takes several attempts to read a code accurately.

U.S. Pat. No. 5,493,805 describes an identification device including a memory "button" or chip which may be embedded within a bracelet, the bracelet worn by a patient. Identification information is electronically stored in the chip and can be accessed by use of a hand held instrument, preferably by simply touching the chip with a probe or the like. In addition to the electronically stored information, basic patient information can be printed on the bracelet for visual observation by a person. Preferably, the chip has a robust construction so that it is removable from the bracelet without being damaged and is then erasable, sterilizable and reusable to identify another patient. However, despite the chips robust construction, this patent contemplates that the chip might be disposable after a single use. Chip disposal is preferred over reuse as reuse might be perceived as unsanitary and may therefore be objectionable. This is particularly true where a patient has a communicable disease or expires while wearing a bracelet. For the purposes of this explanation, a bracelet including a simple memory chip will be referred to herein as a memory chip bracelet.

Memory chip bracelets overcome many of the problems associated with printed bracelets. For example, assuming a well designed memory chip, memory chip bracelets facilitate storage of a relatively large amount of information. In addition, memory chip bracelets facilitate modification of stored information. Moreover, memory chip bracelets facilitate transfer of information from the chip by simply touching the chip via a probe.

Unfortunately, memory chip bracelets also have several shortcomings. First, as with printed bracelets, identifying a patient wearing a memory chip bracelet still requires a doctor, nurse or orderly to position the chip in some orientation where good chip contact can be made. Because a memory chip includes a relatively large amount of information, in many cases the chip will be used more often than printed identification information to access needed information. For example, with a printed bracelet, the bracelet is used only to identify a patient and other information about the patient is usually accessed from some other source (e.g. a computer or a patient file).

With a memory chip bracelet, medicine administration history, treatment history, symptoms, diagnostic history, etc., may all be stored on the chip. Upon entry into a patient's room, the chip may be used once for identification and a second time for medicine or treatment history or to retrieve some other information. The chip may be used one or more additional times to access other information. Repeated chip readings are burdensome.

Second, where memory chips are reusable, despite sterilization there could still be a perception of unsanitary conditions rendering reusable chips objectionable.

Third, where memory chips are reusable, there is a possibility that chip information might not be erased or may only be partially erased prior to being used to identify another patient. Such a mistake could lead to erroneous identification and ultimately to incorrect treatment or diagnosis.

Fourth, chip removal, erasing, sanitizing, reinsertion into a new bracelet and rewriting to identify another patient is a burdensome and relatively expensive procedure, the cost and bother of which probably is not justifiable during all medical facility visits. For example, a ten minute visit probably would not justify such a costly and time consuming procedure.

The U.S. Pat. No. 5,493,805 patent also contemplates a bracelet wherein the chip includes an integral antenna for transmitting information to a hand held device. The preferred transmitter is a radio frequency transmitter wherein an external coil generates a field which provides energy to the chip within the field for transmitting information to the hand held device. Another chip embodiment might include a transmitter and a separate power source (e.g. a battery) providing power to the transmitter for transmitting information. For the purposes of this explanation, bracelets including a transmitter embedded in a chip will be referred to as transmitting bracelets.

Transmitting bracelets eliminate the need for reorientating a bracelet or a patients arm to access information from a chip. However, even transmitting bracelets have several shortcomings. First, while a memory on a chip may be inexpensive, transmitting circuitry on a chip increases chip costs appreciably. While bracelet costs may be defrayed by reusing the transmitting chip as indicated above, even after sterilization, reuse might be perceived as unsanitary and might therefore be objectionable. For these reasons, relatively expensive transmitting bracelets may only be justifiable in instances where a patient is admitted for an extended period and printed bracelets may be more suitable under other circumstances.

Second, as with memory chip bracelets, where a transmitting chip is reused, there is always the danger that a portion of the memory might not be erased prior to rewriting and patient identification or information could be confused.

Third, if a bracelet is designed properly, it is difficult to remove a chip from a bracelet. In patient identification, it is important that a chip be attached to the bracelet so that it cannot inadvertently be removed, dislodged or replaced. If a chip is to be reused, the chip has to be removed despite integral attachment. For this reason, a chip must be securely lodged within and integral with the bracelet to prohibit inadvertent removal. Integral attachment makes removal difficult at best and may require special tools (as recognized in the U.S. Pat. No. 5,493,805 patent), further increasing identification system costs.

Fourth, where a chip has to be removed from a bracelet for sterilization, the chip could be damaged or even destroyed during removal, rendering the chip useless. While damaged memory chips might be inexpensive and therefore disposable, damaged transmitting chips represent appreciable cost.

Fifth, in the alternative, instead of removing a chip from a bracelet, the entire chip and bracelet could be sterilized and the chip erased for reuse. It is even more likely, however, that this option would be perceived as unsanitary. In addition, while the chip could be erased and rewritten, printed identification information on the bracelet could not be easily erased and reprinted.

Sixth, a transmitting chip may be damaged in certain environments. For example, such a chip might not be waterproof and therefore would be damaged during bathing. In addition, a transmitter chip may be susceptible to magnetic or electric fields (e.g. MRI) within a medical environment. Similarly, a transmitter chip might give off a field of its own which could interfere with diagnostic or treatment fields.

Seventh, during extended hospitalization periods, a chip battery might need to be replaced. Replacing a battery while a bracelet is attached to a patient would be difficult at best.

When bathing, within a treatment or diagnostic energy field, or to replace a battery, a bracelet could be removed. However, removal is undesirable because a removed bracelet could be confused with another bracelet. In addition, because bracelets are constructed so that they cannot be easily removed, usually a bracelet would have to be destroyed to be removed.

For all of the reasons discussed above, it would be advantageous to have a patient identification mechanism which is inexpensive, disposable, rewritable, permanent during a patient's stay at a medical facility and accessible without reorientating a patient or the bracelet.

BRIEF SUMMARY OF THE INVENTION

The present invention includes an identification bracelet which includes a plastic strap having first and second ends, an electronic memory device (e.g. a silicon chip), a securing means for securing the first and second ends together around a patient's wrist and a transponder. The memory device is integrally embedded in the strap and cannot be removed from the strap without destroying the device. The transponder includes circuitry which can receive information from and transmit information to remote hand held electronic devices or the like. The transponder is releasibly attachable to the bracelet adjacent the memory device. When attached to the bracelet, the transponder makes contact with the memory device and can receive information from, and provide information to, the memory device.

The bracelet, including memory device, is inexpensive and completely disposable. The transponder is relatively expensive. However, the cost of the transponder is defrayed because the transponder can be sterilized and reused.

One object of the invention is to provide an identification mechanism which can provide a large amount of information about a patient. To this end, in addition to a patient's name and identification number and primary appearance characteristics, the memory device of the present invention can store a patient's complete medical history if desired.

Another object of the invention is to provide a system for identifying patient's which allows remote gathering of information from a patient. A related object is to allow patient identification without physically touching a patient to reorientate an identification bracelet or a patient's arm. With the transponder linked to the memory device, the transponder can access memory information and transmit the information to a remote electronic gathering device.

In addition to having an embedded memory device, the strap may also include a viewing surface on which basic identification information including name, identification number, etc., is printed.

One other object is to provide a single identification system which can be used to identify all patient's in a medical facility. When a patient first enters a hospital, the patient can be provided with a bracelet including a viewing surface and a memory device. Basic information can be printed on the viewing surface while basic information and other more detailed information (if available) can be written to the memory device. If the patient does not remain in the hospital for a long time, a transponder is never attached to the bracelet. During the patient's short stay, the printed information alone is used for identification. When the patient leaves the hospital or shortly thereafter, the bracelet can be removed and discarded.

However, if the patient remains in the hospital for an extended period or will be undergoing extensive review or treatment during a short period, a transponder can be attached to the bracelet and linked to the memory device so that information thereon can be transmitted and altered to reflect recent medical history. Thus, the releasibly securable transponder may or may not be utilized, depending on the circumstances.

Another object is to meet the aforementioned objects yet provide a relatively inexpensive identification system. To this end, when a patient's stay in a hospital is short, the identification bracelet comprises only the plastic strap and the embedded chip. The expensive transponder circuitry is not necessary. In addition, to reduce costs, where a transponder is used and prior to a patient leaving a hospital, the relatively expensive transponder can be removed and sterilized. The inexpensive bracelet and memory device can be discarded. Thus, in many cases the relatively expensive transponder is not needed and, even where a transponder is required, the transponder can be sterilized and reused.

Another object of the invention is to provide an identification system wherein memory is never reused so that erasing and rewriting errors never occur. To this end, no matter what, after a memory device is used to identify one patient, the same memory device is never reused to identify a second patient.

In one embodiment the memory includes both a read only memory (ROM), which can be written to once and then only read, and a random access memory (RAM) which can be written to, erased and rewritten to several times. In this case, it is contemplated that basic identification information like a name and an identification number will be written to the ROM once and thereafter cannot be altered. Other information will be written to the RAM and can later be altered as treatment, conditions, or diagnosis changes. For example, information stored in the RAM can be changed to reflect a patient's current weight should weight change during a long hospital stay or to reflect a procedure to be performed on the patient.

Yet another object is to provide an identification device wherein basic information is unalterable but other information could be altered to reflect changes in treatment, diagnosis, etc. The RAM/ROM mix of memory facilitates this object.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 6 is a perspective view of the bracelet of FIG. 1 in a looped configuration, albeit without the transceiver attached;

FIG. 9 is a plan view of a hand held electronic information gathering device used with the inventive transceiver;

FIG. 10 is a block diagram of the electronics associated with the inventive bracelet;

DETAILED DESCRIPTION OF THE INVENTION

A. Hardware

Figure 1:
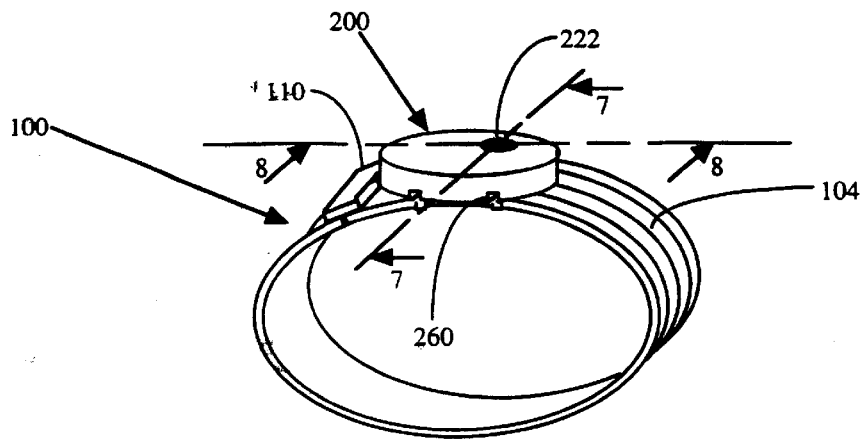
FIG. 1 is a perspective view of an inventive bracelet including a releasibly attached transceiver.
Figure 2:
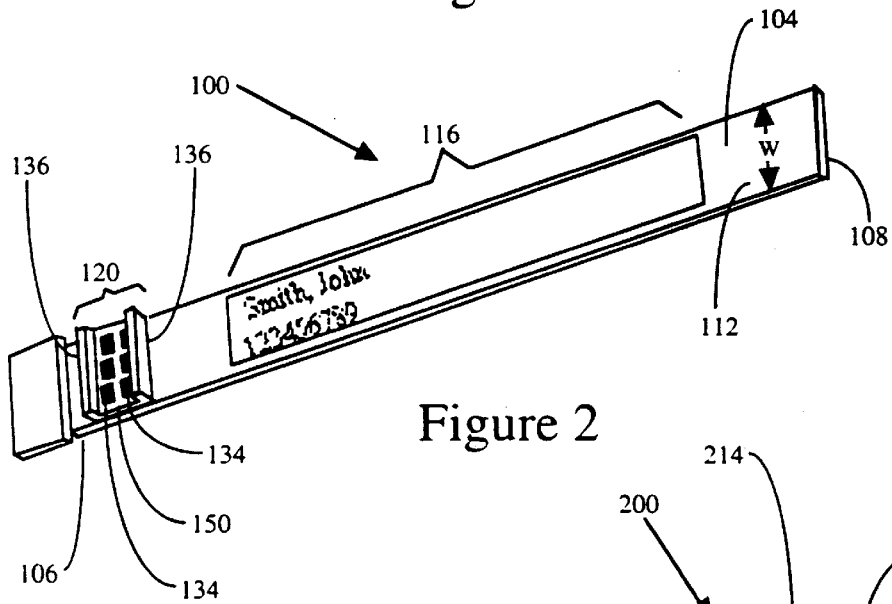
FIG. 2 is a perspective view of the bracelet of FIG. 1, albeit in a flat configuration prior to forming a loop and without the transceiver.
Figure 3:
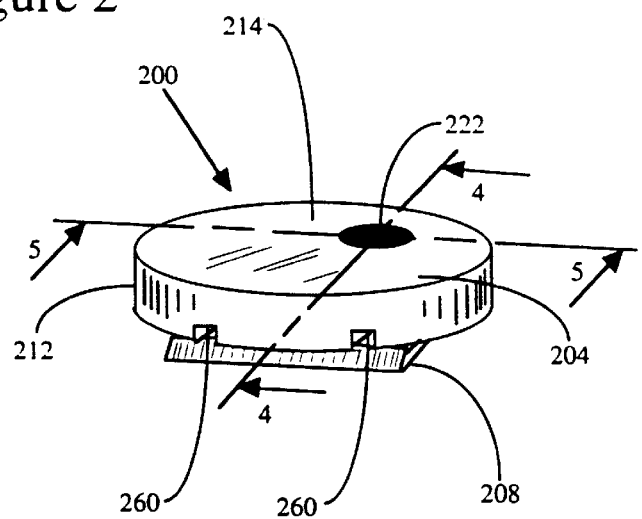
FIG. 3 is a perspective view of the inventive transceiver of FIG. 1.

Referring now to the drawings, wherein like reference characters represent corresponding elements throughout the several views, and more specifically referring to FIGS. 1, 2 and 3, the inventive identification assembly 100 generally includes a bracelet 104 and a communication device in the form of a transceiver 200. Bracelet 104 is preferably formed of a tear resistant plastic material and has first and second ends 106, 108, respectively. A clasp 110 is integrally connected to first end 106 and is constructed so that the clasp 110 can receive second end 108 and lock second end 108 relative to first end 106 forming a loop or ring (see also FIG. 6). To this end, it should be noted that any mechanism for securing ends 106 and 108 together is suitable. For example, the ends may be secured via adhesive, melting, crimping, etc.

Referring specifically to FIG. 2, bracelet 104 forms an identification surface 112 and includes two identification sections including a viewing section 116 and an electronic memory section 120. It is contemplated that basic identification information including a patient's name, an identification number and primary appearance characteristics (e.g. height, weight, hair color, etc.) would be printed on viewing section 116.

Figure 8:
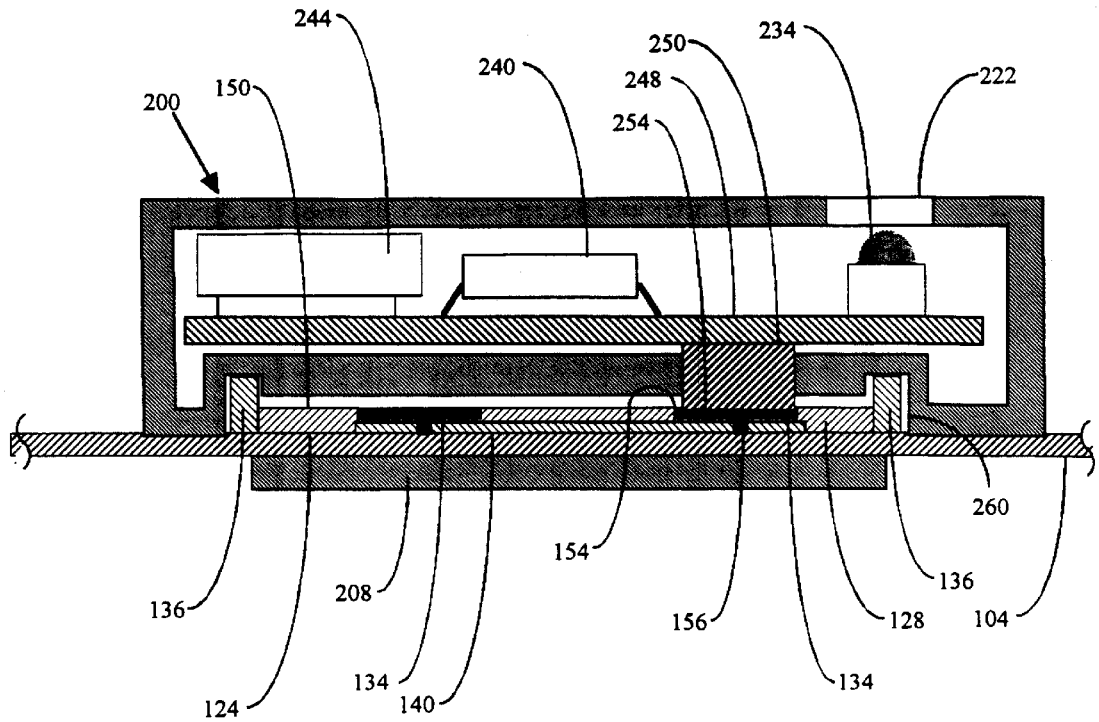
FIG. 8 is a cross sectional view taken along the line 8—8 of FIG. 1.
Figure 7:
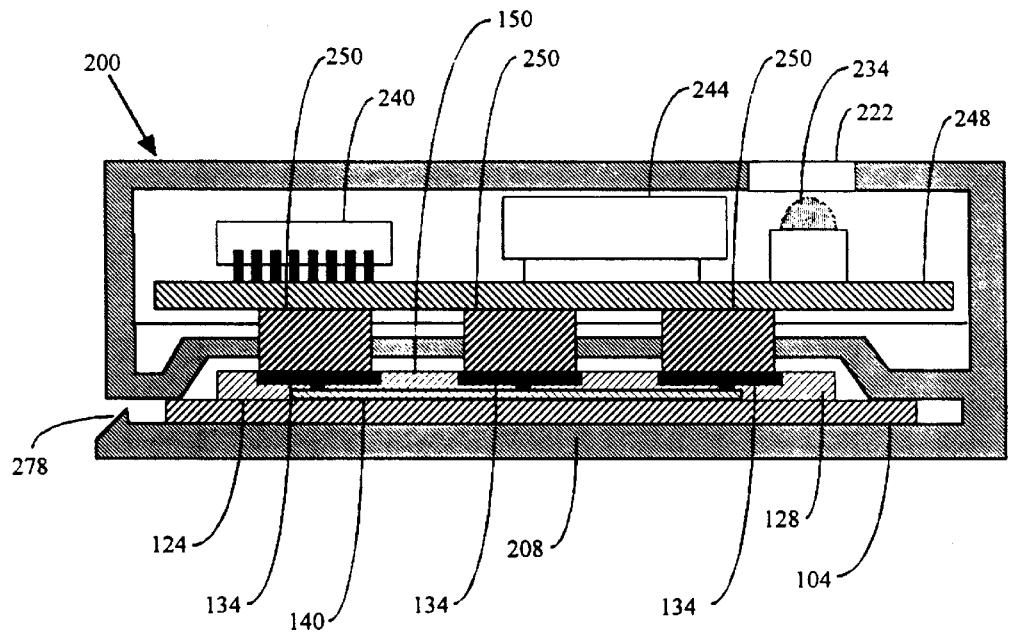
FIG. 7 is a cross sectional view taken along the line 7—7 of FIG. 1.

An electronic memory assembly 124 is provided at memory section 120. Referring also to FIGS. 7 and 8, assembly 124 includes a housing 128, a silicon memory device or chip 140, first and second electrical contact sets, each set including three electrical contacts, the contacts collectively referred to by numeral 134, and first and second guidance or alignment runners collectively referred to by numeral 136. Each set defines a line of contacts 134 which essentially traverses width W and the lines are parallel. Chip 140 can take any of several different forms as well known in the art. At a minimum, chip 140 must be configured to receive digital data via one or more chip inputs (not illustrated) and to provide data via one or more chip outputs (not illustrated). Referring to FIG. 10, preferably, chip 140 includes both a read only memory (ROM) 144 and a random access memory (RAM) 146. ROM 144 is only written to once and thereafter the information therein cannot be altered. RAM 146 can be written to many times and information stored therein can be altered.

In the illustrated embodiment, chip 140 comprises a flat wafer-like element which is centrally deposited within memory section 120. Housing 128 is formed of plastic, covers chip 140 forming an upper surface 150 and is bonded to identification surface 112 covering essentially all of memory section 120. Contacts 134 are exposed at distal ends 154 flush with upper surface 150 and extend down through housing 128 making electrical contact at proximal ends 156 with input and output terminals (not illustrated) on chip 140.

Runners 136 extend from identification surface 112 across a width W of bracelet 104, one runner on either side of housing 128, are parallel, are preferably formed from the same plastic used to form bracelet 104 and are integrally attached to or formed as part of bracelet 104.

Figure 4:
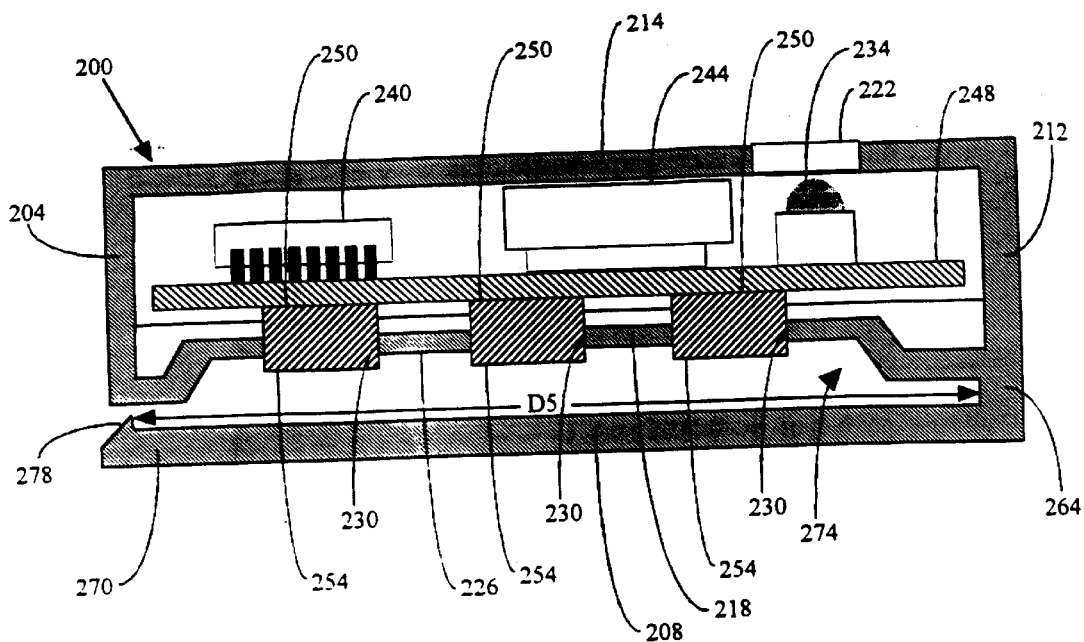
FIG. 4 is a cross sectional view taken along line 4—4 of FIG. 3.
Figure 5:
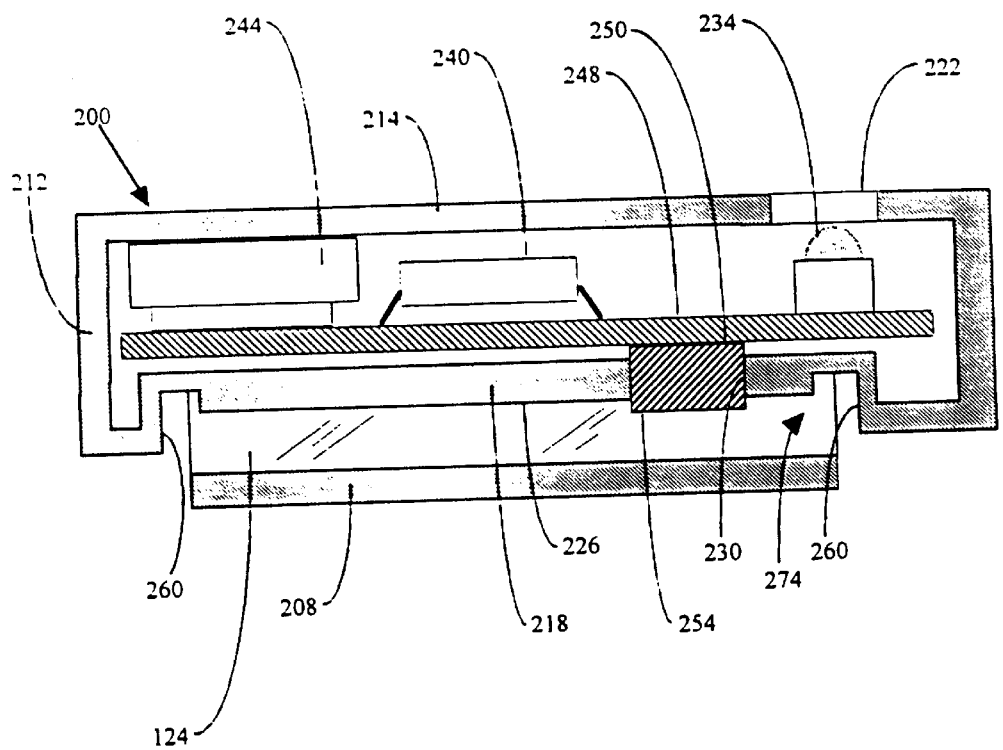
FIG. 5 is a cross sectional view taken along line 5—5 of FIG. 3.

Referring now to FIGS. 3, 4 and 5, among other things transceiver 200 includes a cylindrical transceiver housing 204 and a clip 208. Transceiver housing 204 includes a lateral cylindrical wall 212, a top wall 214 and a base wall 218. Top wall 214 forms a single optical opening or aperture 222. Base wall 218 forms an undersurface 226 and three apertures collectively referred to by numeral 230. Apertures 230 are arranged in the same pattern as a row of contacts 134 (See FIGS. 2, 7 and 8).

Referring to FIGS. 4, 5 and 10, an infrared transponder 234, a processor 240 and a battery 244 are all included inside transceiver 200 and are housed inside housing 204. A circuit board 248 is mounted inside transceiver housing 204. Transponder 234, processor 240 and battery 244 are all mounted on circuit board 248. Transponder 234 is mounted just below optical opening 222 so that infrared signals can be received therethrough and transmitted therethrough. Battery 244 provides power to both processor 240 and transponder 234. Processor 240 is linked to transponder 234 for receiving information therefrom and providing information thereto. Transponder 234 is capable of receiving and sending data via infrared signals and its operation should be well known to those skilled in the electronic arts.

Three electrical contacts are also linked to circuit board 248 and specifically to processor 240. Each of contacts 250 extends down through a separate one of apertures 230. Preferably, a distal end 254 of each contact 250 extends past undersurface 226. Contacts 250 are symmetrically configured to define a line of contacts.

Referring specifically to FIGS. 1, 3 and 5, undersurface 226 forms first and second channels or recesses collectively identified by numeral 260 on opposite sides of apertures 230. Channels 260 are parallel and spaced apart a distance equal to the distance between runners 136. Channels 260 are arranged with respect to contacts 250 such that when runners 136 are received within channels 260, contacts 250 are aligned with one of the lines of contacts formed by contacts 134.

Referring to FIGS. 3, 4 and 5, clip 208 includes an arm like member which has a proximal end 264 integrally connected to base wall 218 at one end of channels 260. Clip 208 extends from a proximal end 264 to a distal end 270 along the direction of channels 260 and is parallel to base wall 218. Thus, undersurface 226 and clip 208 together define a channel 274. A finger-like projection 278 extends from distal end 270 toward undersurface 226 but only traverses part of the distance between distal end 270 and undersurface 226. The distance D5 between proximal end 264 and projection 278 is at least as great as width W of bracelet 104.

Referring to FIG. 9, the inventive bracelet is meant to be used with a hand held data generating and receiving device HHD 300 which includes a display 304, a plurality of buttons for controlling the HHD 300 and an infrared transponder 308. Although not illustrated, HHD 300 also include a processor linked to each of buttons 312, display 304 and transponder 308 for controlling HHD operation. HHD 300, like transceiver 200, can generate and receive information via infrared signals. Thus, HHD 300 and transceiver 200 can communicate and exchange information.

B. Operation

In operation, the inventive patient identification bracelet can be used in several different ways for patient identification. It is contemplated that when a patient enters a medical facility to be examined or treated, initially a bracelet 104 like the one illustrated in FIG. 2 will be provided. To this end, a special printing and electronic writing device (not illustrated) is used to provide identifying information on the bracelet. The identifying information includes basic information (e.g. name, identification number, etc.) printed on identification surface 112 in the viewing area. In addition, the identifying information also includes the basic information and perhaps some other information which is electronically written to chip 140. To write to chip 140 the writing device includes electrical contacts which transmit data when they are placed in contact with contacts 134.

The basic information including name and identification number is written to the ROM while other information which might change during a patient's stay at the facility is written to the RAM so that information can be changed later if desired.

After an identifying bracelet 104 is provided, the bracelet 104 is looped around a patient's wrist (see FIG. 6) and clasp 110 is used to secure ends 106 and 108 together such that bracelet 104 cannot be removed from the patient's wrist without destroying the bracelet 104. Once bracelet 104 is placed around a patient's wrist, the bracelet 104 is not removed until the patient is leaving the medical facility. Thus, because the bracelet remains on the patient at all times, assuming correct information on the bracelet, bracelet information can be relied upon to perform proper patient identification.

When patient treatment or examination of a patient takes a short time, a bracelet without a transceiver is sufficient for identification purposes and therefore no transceiver is provided. To identify a patient, a person simply reads information from viewing section 116 in the conventional manner. In the alternative, a person having a special reading device could make electrical contact with contacts 134 and read information stored on chip 140.

However, when patient treatment or examination is extended or involves many facility personnel so that patient identification has to be performed many times during treatment or examination and identification becomes bothersome to a patient and tedious for facility personnel, a transceiver 200 is provided on bracelet 104 as illustrated in FIG. 1.

Referring to FIGS. 1 through 5, to attach transceiver 200 to bracelet 104, channel 274 is aligned with memory section 120 such that runners 136 are aligned with channels 260 and projection 278 is adjacent memory section 120. Then, memory section 120 is forced into channel 274 so that runners 136 are received within channels 260. Referring also to FIGS. 7 and 8, after memory section 120 is completely within channel 274, distal ends 254 of each contact 250 touch contacts 134 and are pressed thereagainst between undersurface 226 and clip 208. When so positioned, processor 240 can receive information from, or provide information to, chip 140 via contacts 250 and contacts 134.

Referring also to FIG. 9, with transceiver 200 firmly attached to bracelet 104 a doctor or nurse can use an HHD 300 to send infrared signals to transceiver 200. The infrared signals generated via HHD 300 should be of limited strength so that only a transceiver within a short range of the emitting device will receive the emitted signals. For example, signal strength might be limited such that only a transceiver within two or three feet of the HHD will receive emitted signals. For the purposes of this explanation, the term emitting range will be used to refer to the distance over which emitted infrared signals will be received via transceiver 200.

Referring still to FIG. 9 and also to FIGS. 7 and 8, to identify a patient, a doctor or nurse places HHD 300 within the emitting range of transceiver 200. The doctor then presses one of buttons 312 instructing HHD 300 to send a signal to transceiver 200 indicating that the transceiver should provide at least a subset of the information which identifies the patient and is stored on chip 140. After the appropriate button 312 is pressed, HHD 300 sends an infrared signal via transponder 308.

Assuming transceiver 200 is close enough to HHD 300 to receive the infrared signal, transponder 234 receives the signal and provides the signal to processor 240. Processor 240 decodes the signal, recognizes that the signal requests identifying information from chip 140 and accesses chip 140 via contacts 250 and 134. Once identifying information has been read from chip 140, processor 240 formats the information into a message for delivery to HHD 300. Next, processor 240 sends the message via transponder 234 and infrared signals to transponder 308. Assuming transponder 308 is still within the emitting range, transponder 308 receives the identifying message and displays the message via display 304 for the doctor or nurse to view. In addition, the HHD may store the identifying message for later retrieval or may correlate the identifying message with other information about the patient, thereafter displaying the correlated information in addition to patient identification.

During a patient's stay at a facility, transceiver 200 can be removed for any of a number of different reasons. For example, prior to bathing a patient transceiver 200 can be removed. In addition, transceiver 200 can be removed to replace a battery. Moreover, transceiver 200 can be removed prior to surgery or prior to placing a patient in a diagnostic or treatment field. In addition, if transceiver 200 becomes damaged it can be replaced. Importantly, in each of these cases, when transceiver 200 is removed, bracelet 104 remains on the patient's wrist. Thus, the patient is never separated from his/her identification information and the changes of incorrect identification are essentially negligible.

In addition, medical history or future treatment information can be stored on chip 140 which can be accessed via HHD 300 or other medical equipment such as an imaging machine or a treatment machine equipped with a transponder and a processor. Moreover, information on chip 140 can be used in conjunction with diagnostic and treatment equipment to ensure that diagnostic and treatment procedures are not performed on incorrect patients. To this end, each diagnostic and treatment machine can be equipped with a transponder device for communication with transceivers 200. Like the HHD, prior to performing a diagnostic or treatment procedure on a patient, it is contemplated that the machine sends an interrogation message via its transponder to a patient's transceiver 200 requesting that the transceiver identify the patient. In response transceiver 200 sends back identifying information. The machine then compares received information with information correlated to the patient for whom the treatment or diagnosis was ordered. If the information received is identical to the correlated information, the machine initiates and performs the procedure. However, if the information is not identical, the machine indicates that there is no match and halts the procedure until a doctor or nurse can identify the discrepancy.

In addition to reading information from chip 140, processor 240 can also add information to the information already stored in chip 140 or can rewrite information thereby changing information in the RAM section of chip 140. To this end, HHD 300 can also be used to send additional information to transceiver 200 for updating or adding information to chip 140. When this type of information is received by processor 240 via transponder 234, processor 240 decodes the information and recognizes the information as updated or additional information to be stored on chip 140. Then processor 240 writes to chip 140 providing the updated or additional information.

After patient treatment and examination and before the patient leaves the medical facility, transceiver 200 can be removed from bracelet 104 by simply separating clip 208 from undersurface 226 and removed bracelet 104 from channel 274. Once transceiver 200 is removed, bracelet 104 can be removed from the patient's wrist by cutting and bracelet 104 can be discarded. Transceiver 200 is then sterilized and can be reused at a later time to identify another patient by clipping transceiver 200 on a different bracelet.

C. Alternative Embodiments

Figure 11:
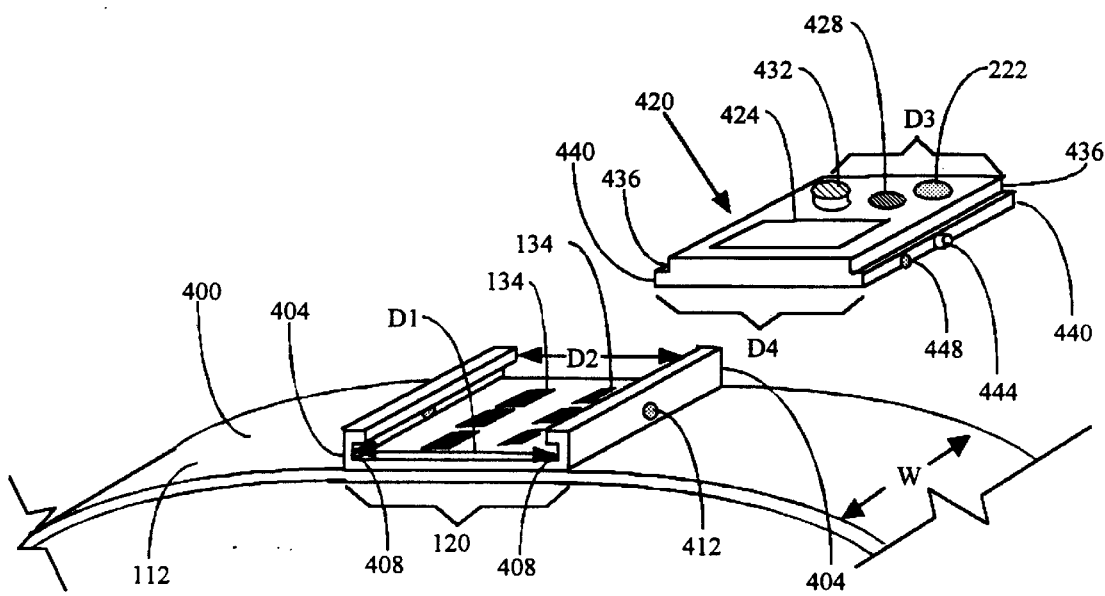
FIG. 11 is a perspective view of a second embodiment of an inventive identification bracelet with a transceiver disconnected from a bracelet strap.

Referring now to FIG. 11, a second embodiment of the present invention is illustrated. As with the first embodiment, the second embodiment includes a bracelet 400 and a detachable transceiver 420. Many components of this second embodiment are essentially identical in both form and function to the first embodiment and therefore will not be explained here again in detail. This second embodiment differs from the first embodiment in several ways.

Transceiver 420 includes several features which are not, but could be included, in the first embodiment. For example, in addition to the features described above, transceiver 420 includes a display 424, an indicator device 428 and a button 432. It is contemplated that display 424 might be an LCD linked to a transponder processor (similar to FIG. 10) for visually imparting patient identifying information.

Indicator device 428 is also linked to the transceiver processor, can take several different forms and can be used for any of several different purposes. For example, indicator device 428 can be an audio alarm which generates a loud buzz, beep or ring. In the alternative, indicator device 428 may be a visual alarm (i.e. light source) for emitting light. One application for indicator device 428 is to indicate when transceiver 420 has received a signal via transponder 234. Similarly, indicator device 428 could be used to indicate when transceiver 420 is transmitting a signal. To either of these ends, indicator device 428 can either generate an audio or a visual indicator signal updating transceiver status.

In addition, where the transceiver processor has interrogation capability, indicator device 428 may be used as an alarm. For example, one system is described above wherein a diagnostic or treatment machine interrogates a patient bracelet prior to performing a diagnostic or treatment procedure. Where a machine interrogates a bracelet and patient information transmitted by the bracelet is not identical to information corresponding to a patient for which the diagnosis or treatment was ordered, the machine will not perform the procedure until a doctor or nurse determines why the information did not match. Here, where the transceiver has interrogation capability, instead of the machine interrogating the transceiver processor, the processor may instead interrogate the machine.

It is contemplated that prior to a diagnostic or treatment procedure, a diagnostic or treatment machine sends information to the transceiver identifying the patient for which the treatment was ordered. Upon receiving the identifying information, the transceiver processor compares the information to the patient identifying information stored in the transceiver memory. If the information received is identical to the information stored the transceiver does nothing or may send back a confirmation signal. However, if the information received and stored is different, transceiver 420 excites indicator device 428 thereby either audibly or visually indicating that the pending procedure should be halted.

Button 432 is also linked to the transceiver processor and can be depressed to manually cause transceiver 420 to transmit patient information. In addition, button 432 can be used in conjunction with display 424 to cause identifying information to either appear on or scroll across display 424. Moreover, button 432 could be an electronic lead which could be touched with an electronic probe attached to an HHD or the like to electronically transfer information from a bracelet memory.

In addition to having additional features, the manner in which transceiver 420 connects to bracelet 400 is different in this second embodiment. Instead of having alignment runners 136 (see FIG. 2), referring still to FIG. 11 and also to FIG. 12, bracelet 400 now forms two parallel tracks collectively referred to by numeral 404 which extend upwardly from identification surface 112 on opposite sides of memory section 120. Facing surfaces of tracks 404 form linear recesses collectively referred to by numeral 408 which traverse across bracelet width W. Recesses 408 define a distance D1 therebetween while distal ends of tracks 404 define a distance D2 which is slightly less than distance D1. An aperture 412 is formed by each track 404 which extends laterally and centrally through the track recess 408.

The outer shell of transceiver 420 is square having oppositely facing lateral surfaces collectively referred to by numeral 436 which define a transceiver dimension D3. Two lateral extensions collectively referred to by numeral 440 extend laterally from surfaces 436, a separate extension 440 extending from each of surfaces 436. The distal ends of extensions 440 define a dimension D4 which is greater than dimension D3. A spring loaded button 444 extends laterally and centrally from each lateral extension 440 (only one illustrated). Dimension D4 is essentially the same as dimension D1 while dimension D3 is essentially the same size as dimension D2. Thus, transceiver 420 fits within the space defined by tracks 404.

To secure transceiver 420 to bracelet 400, transceiver 420 is placed at either end of tracks 404 with extensions 440 aligned with recesses 408. Then transceiver 420 is forced along tracks 404 such that extensions 440 are received within recesses 408. Eventually, buttons 444 are forced outwardly through apertures 412 and secure transceiver 420 to bracelet 400. To remove transceiver 420 from bracelet 400, buttons 444 are depressed and transceiver 420 is slid out from between tracks 404.

One problem which might occur when attempting to interrogate a bracelet is that the bracelet might be positioned so that the bracelet transponder is not directly accessible. In this case, a person trying to identify the patient might have to reposition the bracelet, a procedure which should be avoided if possible. One other feature of the second embodiment which is different than the first is that this embodiment is designed so that it can transmit (and receive) infrared information from many secondary transmitters positioned at different bracelet surface points, thereby overcoming the position problem.

Figure 12:
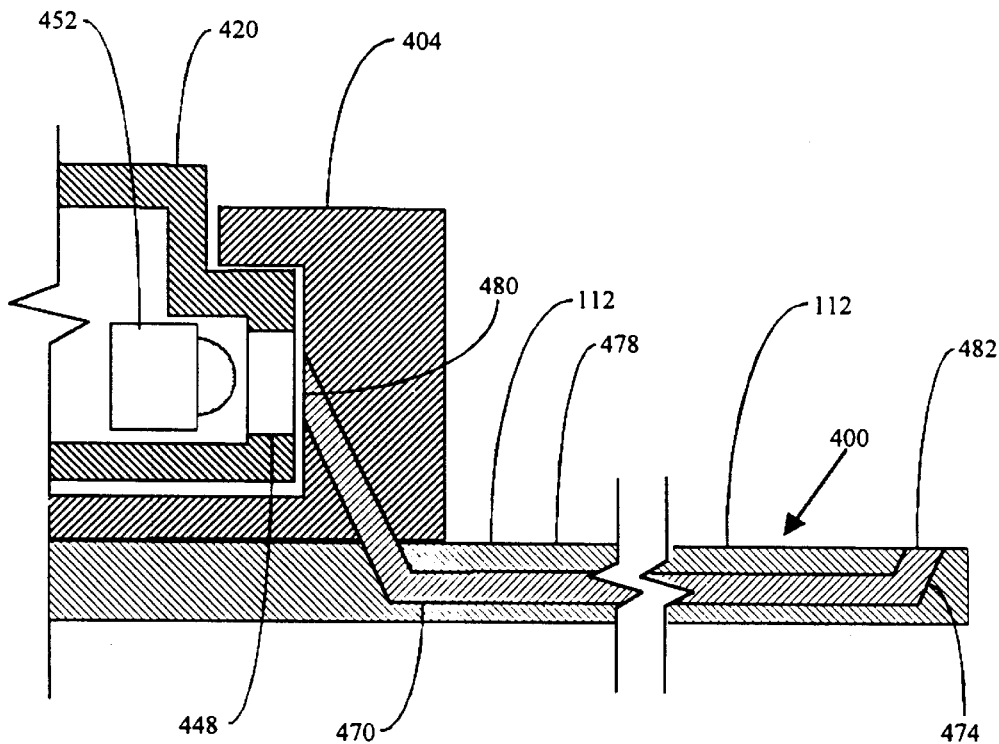
FIG. 12 is a cross sectional view of the bracelet of FIG. 11, albeit with the transceiver connected to the bracelet strap.

To this end, referring to FIGS. 11 and 12, a lateral transponder port 448 is formed by the transceiver shell in one of extensions 440 adjacent button 444. An infrared transponder 452 linked to the transceiver processor is positioned adjacent port 448 for transmitting and receiving infrared signals through port 448.

Bracelet 400, including one track 404, forms a channel 470. Channel 470 begins within recess 408, passes through track 404 and then through and along a length of the bracelet forming an outlet 474 which extends through identification surface 112. A fiber optic member 478 having proximal and distal ends 480 and 482 is positioned within channel 470, proximal end 480 within recess 408 and distal end 482 terminated at outlet 474. When transceiver 420 is secured to bracelet 400, port 448 is aligned with proximal end 480. Thus, light transmitted by transponder 452 is received by proximal end 480 and is again emitted through distal end 482. Similarly, light received by distal end 482 is emitted through proximal end 480 and is received by transponder 452.

Figure 13:
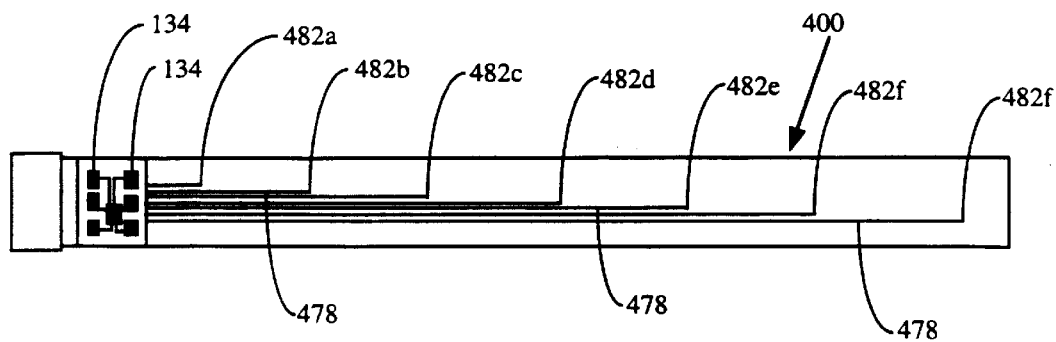
FIG. 13 is a top plan view of a preferred bracelet strap.

Referring also to FIG. 13, preferably, a plurality of fiber optic members 478 are provided within bracelet 400, each member distal end 482a, 482b, 482c, 482d, 482e, 482f and 482g terminating at a different position along the length of bracelet 400. It is contemplated that each member proximal end (not illustrated) would be adjacent port 448 so that a single transponder 452 could provide signals to and receive signals from each member distal end 482. In this embodiment bracelet 400 operates like a large antenna so that the bracelet is always in a position to receive and transmit information.

A variation on this embodiment might include an additional transponder linked directly to the transceiver which, when the transceiver is secured to the bracelet, wraps around the bracelet so that the second transponder is located on the opposite side of a patient's wrist from the main portion of the transponder. In this case, the transceiver could transmit and receive information on both sides of a patient's wrist.

Figure 14:
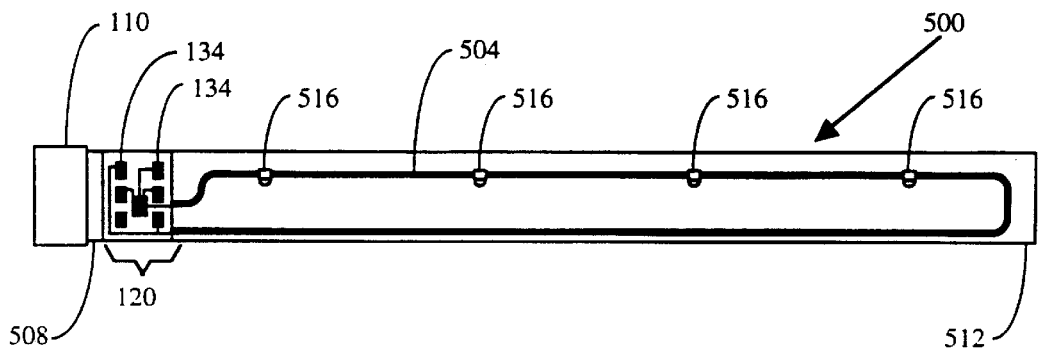
FIG. 14 is a view similar to FIG. 13, albeit of a third preferred embodiment of the inventive strap.

Referring also to FIG. 14, a third embodiment of the invention is illustrated. As transponders become less expensive, it is contemplated that it will become economically viable to provide a ring of discardable transponders on a bracelet 500. A conductive loop 504 having first and second loop ends and a midsection can be linked via contacts 134 to a transceiver processor (not illustrated). The loop 504 midsection traverses the length of bracelet 500 from a first end 508 to a second end 512. A plurality of transponders 516 are connected to loop 504. Signals to be transmitted are then provided to each transponder 516 for transmitting. Thus, this embodiment also solves the bracelet positioning problem by facilitating transmission and reception of signals from essentially all sides of bracelet 500.

In addition, this third embodiment is advantageous for other reasons. For example, loop 504 can be linked to contacts 134 such that when loop 504 is cut (e.g. to take bracelet 500 off), contacts 134 cannot impart or receive information from a transceiver processor. In this case, placement of memory section 120 is important. By placing memory section 120 next to clasp 110 at first end 508, loop 504 can traverse along essentially the entire length of bracelet 500 thereby making it nearly impossible to remove bracelet 500 without rendering the memory thereon unusable. Here, to remove bracelet 500 a person would have to cut through either memory section 120 or loop 504. An alternative where memory section 120 is centrally disposed along the bracelet length would be to provide a second loop (not illustrated) extending from memory section 120 in the direction opposite of loop 504 traversing the distance between memory section 120 and clasp 110.

Figure 15:
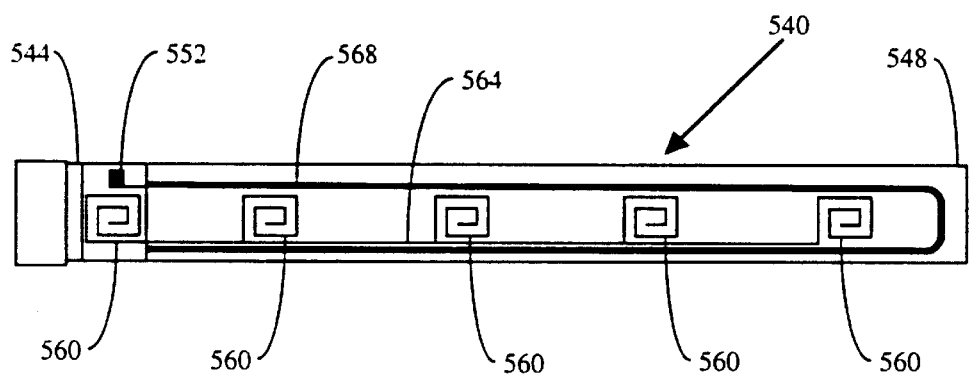
FIG. 15 is a view similar to FIG. 13, albeit of a fourth preferred embodiment of the inventive strap.

In addition to the embodiments described above, as transceiver circuitry becomes less expensive, it might become viable to have a transceiver built into a disposable bracelet. This is particularly true where only a small amount of patient identification information is required. For example, an HHD or a computer which interrogates a bracelet might be equipped with a patient data base for storing detailed patient information. In this case, the bracelet might only require a small amount of identification information such as a unique patient number. Once an HHD receives a patient number, the HHD can correlate the number with the patient's name and other information regarding the patient. In this case the transceiver processor would be extremely inexpensive and could be discardable.

Where an entire bracelet, including transceiver, is discardable, a particularly advantageous bracelet may be configured. Referring to FIG. 15, a fourth embodiment of an inventive bracelet 540 is illustrated. Bracelet 540 includes a strip of plastic or Kapton material having first and second ends 544, 548, respectively. A clasp 110 is linked to end 544 for connecting ends 544 and 548 together. A memory 552 is secured to bracelet 540 as are a plurality of rf transponder circuits collectively referred to by numeral 560. Memory 552 is linked to each of circuits 560 by a bus 564. A conductive loop 568 is also linked to each of circuits 560 to provide power thereto. To provide power to circuits 560, loop 568 is constructed such that, when placed within a specific signature magnetic field, a current is generated in loop 568 which powers circuits 560 and memory 552. When circuits 560 and memory 552 are powered, each circuit 560 transmits the abbreviated patient identification information stored in memory 552.

It is contemplated that an HHD can be equipped with a magnetic coupling device useable to generate the loop's signature magnetic field thereby imparting energy to circuits 560. When circuits 560 are energized, transmitted information is received by the HHD. Then, the HHD correlates the patient information with more detailed information which is presented to a health care worker for review.

This fourth embodiment has many advantages. In addition to imparting patient identification information without being touched, where loop 568 traverses the entire length of bracelet 540, bracelet 540 could not be removed without destroying loop 568 and thereby destroying the power source for circuits 560. Thus, once removed, bracelet 540 would not be able to identify a patient. In addition, no battery is required with this fourth embodiment.

In the alternative, the fourth embodiment might only include one circuit 560 or each circuit 560 might include its own loop 568.

It should be understood that the apparatuses described above are only exemplary and do not limit the scope of the invention, and that various modifications could be made by those skilled in the art that would fall under the scope of the invention. For example, while two fasteners are described above for connecting a transceiver to a bracelet, clearly other fasteners could be used to make this connection. In addition, while the present invention is described as one using infrared transponders, other types of transponders (e.g. rf transponders) could be used. Moreover, while an HHD is described as the remote electronic device used with the inventive bracelet clearly other devices such as a personal computer having a transponder attached thereto could be used for this purpose. Furthermore, the bracelet need not include printed information. In addition, while conductive loops have been illustrated and described above for absorbing electromagnetic energy and linking a memory to one or more transmitters, it would also be advantageous to provide a loop which traverses the entire length of a bracelet simply to ensure that once the bracelet is cut off one patient it is never again secured to a different patient. To this end, a loop could be configured which, when cut, forms an open circuit in the memory thereby rendering the memory unusable.

Moreover, while the invention is described above as including electrical contacts on the transceiver and the bracelet, clearly the invention should not be so limited. For example, transceiver 200 may be designed to communicate with chip 140 via magnetic coupling wherein transceiver 200 excites chip 140 and, when chip 140 is excited, chip 140 transmits data via an electromagnetic field which is sensed by transceiver 200. Because transceiver 200 and chip 140 are very close when linked, a very small field would be required to excite chip 140 and transmit information back and forth between chip 140 and transceiver 200. Magnetic coupling might be advantageous in that manufacturing tolerances could be reduced as contacts need not be precisely positioned for proper operation. This is particularly advantageous in instances where a transceiver is routinely removed or is used many times thereby subjecting contacts to extreme wear and tear. Thus, the term "contact" is used generically to identify any element which can be linked in any way (e.g. electrically, mechanically, magnetically, through use of light, etc) to another element or contact for exchanging data.

In addition to the operations described above, the present invention contemplates that the inventive apparatus could be used to perform other operations. For example, when a patient is to have a magnetic resonance imaging procedure performed, an imaging machine can query a transceiver to determine if a patient on whom the procedure is about to be performed is the correct patient. If two transceiver are within transmitting distance of the machine, a correct transceiver attached to the patient on whom the procedure is to be performed, both transceivers might respond simultaneously. In this case, several different features might be provided for.

For example, the machine might indicate an error and allow a technician to identify the patient wearing the correct transceiver. In the alternative, the machine might transmit a signal to each transceiver within transmitting range indicating that the correct transceiver should identify itself. Where the correct transceiver is equipped with a light, a visual display or an audio beeper, the correct transceiver could indicate itself by lighting the light, indication on the display, or sounding the beeper.

To apprise the public of the scope of this invention, I make the following claims:

I claim:

1. An identification assembly for identifying an object, the assembly comprising:

(A) a strap assembly including:
      (1) a strap having first and second end segments and capable of assuming a secured configuration wherein the first and second end segments are adjacent and the strap forms a loop around the object;
      (2) an electronic memory means integrally secured to the strap such that the memory means cannot be removed from the strap without damaging the strap, the memory means including at least one memory contact through which data stored in the memory means can be accessed;
   (B) a transmitter assembly including:
      (1) at least one transmitter contact;
      (2) a powersource;
      (3) a data transmitter;
      (4) a processor linked to the transmitter contact for receiving data from the transmitter contact and linked to the transmitter for transmitting data received from the transmitter contact; and
   (C) a fastener for releasibly fastening the transmitter assembly to the strap assembly such that the transmitter contact and memory contact are linked and data in the memory can be accessed by the transmitter.

2. The apparatus of claim 1 wherein the strap includes a flat segment on which identification information is printed for visual observation.

3. The apparatus of claim 1 wherein the strap is essentially formed of flexible plastic.

4. The apparatus of claim 3 wherein the strap includes at least one rigid segment and the memory means is integrally secured to the rigid segment.

5. The apparatus of claim 1 wherein the fastener is a first fastener and the assembly further includes a second fastener for securing the strap in the secured configuration such that the end segments cannot be separated without damaging the strap.

6. The apparatus of claim 1 wherein the transmitter is an RF transmitter.

7. The apparatus of claim 1 wherein the transmitter is an infra-red transmitter.

8. The apparatus of claim 1 wherein each of the memory and transmitter contacts are electrical contacts.

9. The assembly of claim 1 wherein the fastener includes a transmitter assembly housing and an arm member, the housing including a base wall, the arm member having proximal and distal ends, connected to the base wall at the proximal end and substantially parallel to the base wall such that the base wall and arm member together form a channel, the strap received within the channel when the transmitter is fastened to the strap.

10. The assembly of claim 9 wherein the transmitter contact extends through the base wall into the channel.

11. The assembly of claim 9 wherein the fastener further includes a finger extension extending from the distal end of the arm member toward the base wall, the strap received within the channel between the finger extension and the proximal end.

12. The apparatus of claim 1 wherein the fastener includes a transmitter assembly housing, the strap assembly further includes a first alignment means adjacent the memory contact and the housing includes a second alignment means positioned relative to the transmitter contact, the first and second alignment means alignable during fastening such that the transmitter and memory contacts can be blindly aligned during fastening.

13. The apparatus of claim 12 wherein the first alignment means includes at least one runner extension and the second alignment means includes at least one recess for receiving the runner extension when the transmitter assembly and the strap assembly are fastened.

14. The apparatus of claim 1 wherein the power source is a battery.

15. The apparatus of claim 1 wherein the transmitter transmits data received from the transmitter contact periodically.

16. The apparatus of claim 1 wherein the strap assembly further includes at least one secondary transmitter secured to a bracelet section separate from the memory section, when the transmitter assembly is attached to the strap, the secondary transmitter linked to the transmitter assembly for receiving data from the electronic memory and transmitting received data.

17. The apparatus of claim 16 wherein the transmitter is an infrared light transmitter and the secondary transmitter includes a fiber optic member having proximal and distal ends, the proximal end positioned adjacent the infrared light and the distal end terminated at an external surface of the strap.

18. The apparatus of claim 17 wherein the fiber optic member includes a plurality of fiber optic members, the distal end of each optic member terminated at a different point along the external surface of the strap.

19. The apparatus of claim 16 wherein the secondary transmitter includes at least one infrared transmitter.

20. The apparatus of claim 1 wherein the strap further includes a conductive loop having first and second loop ends and a midsection therebetween, each of the first and second loop ends linked to the memory means such that if the midsection of the loop is cut, the memory means cannot impart information, the midsection of the loop traversing essentially the entire length of the strap between the first and second end segments.

21. The apparatus of claim 1 wherein the transmitter assembly further includes an alarm.

22. The apparatus of claim 1 for use with a data gathering assembly which can transmit a query signal and receive transmitted data for display, the apparatus further including a receiver for receiving the query signal and providing the query signal to the processor, when a query signal is received, the processor accessing the memory to retrieve data in response to the query, the transmitter transmitting retrieved data.

23. The apparatus of claim 22 also for use with a data modifier assembly which can transmit modified/additional/new data, the receiver also capable of receiving modified/additional/new data and transmitting the modified/additional/new data to the processor, the processor updating the data in the memory means with the modified/additional/new data when the modified/additional/new data is received.

24. The apparatus of claim 1 wherein the memory means includes a read only memory and a random access memory.

25. The apparatus of claim 1 wherein the contacts are electromagnetic transceiver which can be linked via electromagnetic fields to exchange information.

26. An identification assembly for identifying an object, the assembly comprising:
(1) a strap having first and second end segments and capable of assuming a secured configuration wherein the first and second end segments are adjacent and the strap forms a loop around the object;
(2) an electronic memory means integrally secured to the strap such that the memory means cannot be removed from the strap without damaging the strap;
(3) at least one transmitter circuit linked to the memory means for receiving data from the memory means, when the circuit is excited, the circuit transmitting information stored in the memory means; and
(4) a conductive loop having first and second ends and a midsection, the first and second ends linked to the transmitter circuit, the loop configured such that when placed within a signature magnetic field, a current is generated in the loop which excites the transmitter circuit, the loop traversing essentially the entire length of the strap such that the strap essentially cannot be cut without cutting the loop.

27. The apparatus of claim 26 wherein the at least one circuit includes a plurality of circuits, each circuit linked to both the memory and the loop.

28. An identification apparatus for identifying a patient having a wrist, the apparatus for use with a transmitter assembly including at least one transmitter contact, a power source, a data transmitter, a processor linked to the transmitter contact for receiving data from the transmitter contact and linked to the transmitter for transmitting data received from the transmitter contact and a first fastener means, the apparatus comprising:
a strap having first and second end segments and capable of assuming a secured configuration wherein the first and second end segments are adjacent and the strap forms a loop around the patient's wrist;
an electronic memory means integrally secured to the strap such that the memory means cannot be removed from the strap without damaging the strap, the memory means including at least one memory contact through which data stored in the memory means can be accessed; and
a second fastener means which is capable of cooperating with the first fastener means to releasibly secure the transmitter assembly to the strap assembly such that the transmitter contact and memory contact are linked and data in the memory can be accessed by the transmitter.

29. A method to be used with a bracelet assembly for rendering the assembly capable or incapable of remote communication, the assembly including a strap, a transmitter assembly, a power source and a data transmitter, the strap having first and second end segments and capable of assuming a secured configuration wherein the first and second end segments are adjacent and the strap forms a loop around the object, an electronic memory means linked to the strap and including a memory contact, the transmitter assembly including a transmitter contact and a processor linked to the transmitter contact for receiving data from the transmitter contact, the power source and data transmitter linked to either the strap or the transmitter assembly, the transmitter assembly releasibly linkable to the strap such that the transmitter contact and memory contact are linked and the processor can retrieve information from, or provide information to, the memory, when the transmitter is linked to the strap, the processor linked to the power source and the data transmitter such that the processor can transmit information via, or receive information via, the transmitter, the method comprising the steps of:
securing the strap in a loop about the object;
to render the bracelet assembly capable of remote communication, securing the transmitter assembly to the strap such that the memory and transmitter contacts are linked; and
to render the bracelet assembly incapable of remote communication, delinking the memory and transmitter contacts.

30. The method of claim 29 wherein the object is a patient and information stored in the memory is patient identification information and there is at least one environmental or bracelet assembly condition in which it is advantageous to remove the transmitter assembly from the strap and the method further includes the step of, prior to delinking, determining if the at least one condition exists and, if the one condition exists, the step of delinking includes the step of removing the transmitter assembly from the strap.

31. The method of claim 30 further including the steps of, determining if the at least one condition has subsided and, if the condition has subsided, resecuring the transmitter assembly.

32. The method of claim 30 wherein the at least one condition is a depleted battery.

* * * * *